T. E. McNEILL.
Return-Steam Trap.
No. 198,138.　　　　　　Patented Dec. 11, 1877.
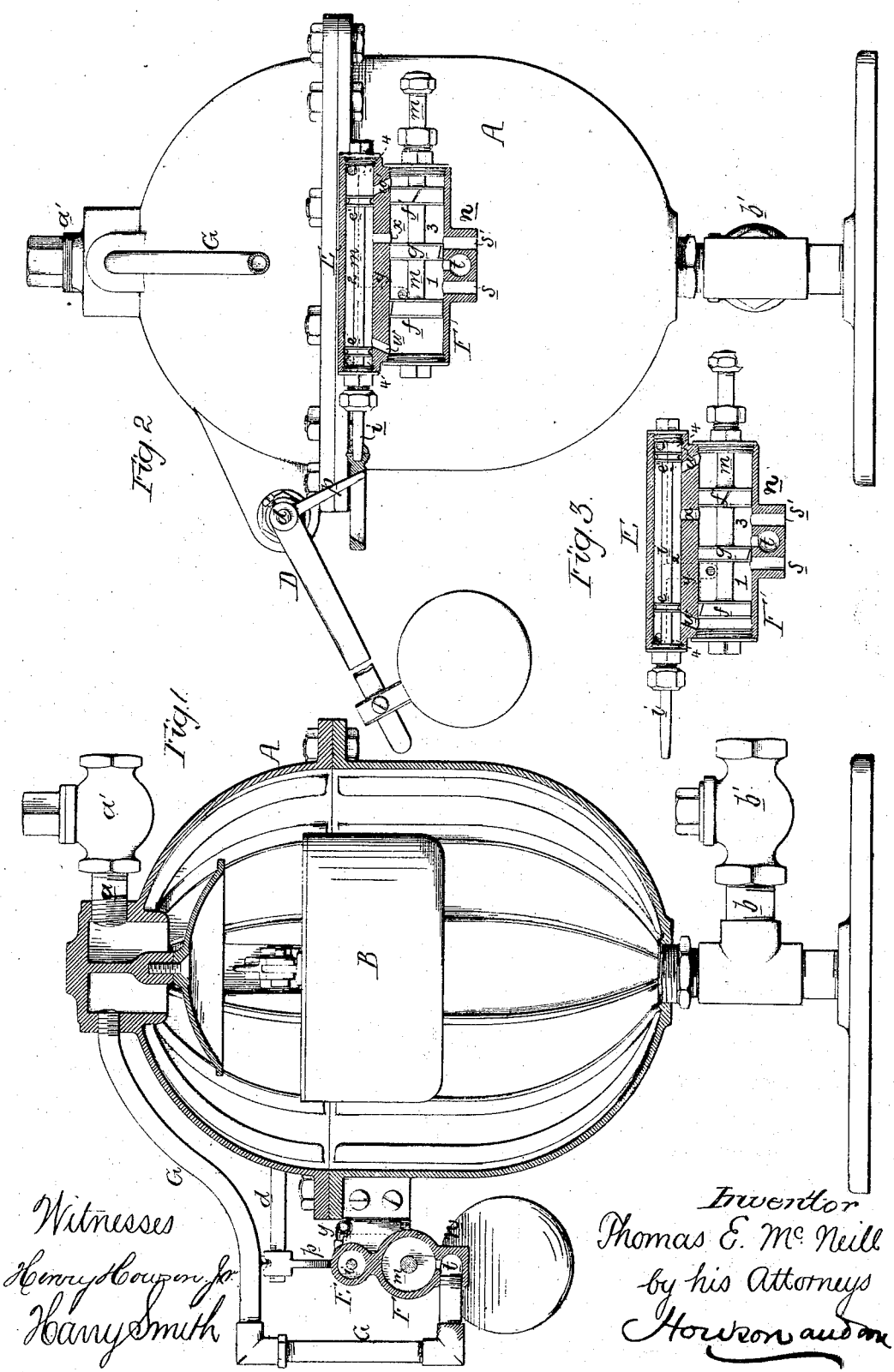

UNITED STATES PATENT OFFICE.

THOMAS E. McNEILL, OF NEW YORK, N. Y.

IMPROVEMENT IN RETURN-STEAM TRAPS.

Specification forming part of Letters Patent No. 198,138, dated December 11, 1877; application filed March 9, 1877.

*To all whom it may concern:*

Be it known that I, THOMAS E. MCNEILL, of New York city, State of New York, have invented a new and useful Improvement in Return-Steam Traps, of which the following is a specification:

The object of my invention is to construct a return-steam trap and boiler-feeder of a more simple and effective character than usual—an object which I attain in the manner hereinafter described, reference being had to the accompanying drawing, in which—

Figure 1 is a longitudinal vertical section of my improved return-steam trap and boiler-feeder; Fig. 2, an end view, partly in section; and Fig. 3, a portion of Fig. 2, with the moving parts in a different position.

A is the reservoir of the trap, which communicates at the top, through a pipe, $a$, having a check-valve, $a'$, with the coil or coils of steam-pipe to be drained, and at the bottom, through a pipe, $b$, having a check-valve, $b'$, with the boiler.

Within the reservoir is the usual bucket or float B, hung to an arm carried by a shaft, $d$, which is adapted to a bearing at the side of the reservoir, and one end of which projects beyond said bearing, and carries a weighted bell-crank lever, D.

Secured to a lug on the front of the reservoir A is a casing, consisting of two cylinders, E and F, arranged one above the other, the upper cylinder being provided with two valves, $e$ and $e'$, carried by a valve-rod, $i$, while to the lower cylinder are adapted two pistons, $f$ and $f'$, and a valve, $g$, all carried by a rod, $m$.

A projection, $n$, is formed on the lower portion of the cylinder F, and in this projection are three passages, $s$, $s'$, and $t$, all of which communicate with the interior of the cylinder F.

The passage $s$ communicates with the atmosphere, by preference through a pipe having a suitable stop-valve, the passage $s'$ communicates with the steam-space of the boiler, and the passage $t$ communicates, through a pipe, G, with the interior of the reservoir A, at the top of the same.

The two cylinders communicate with each other through passages $w$, $w'$, and $x$, and through a pipe, $y$, (shown in Fig. 1, and in dotted lines, Figs. 2 and 3,) the said pipe serving to maintain constant communication between the cylinder F and the opposite ends of the cylinder E.

The projecting end of the valve-rod $i$ is slotted, and to this slotted portion is adapted the end of the short arm $p$ of the lever D on the bucket-shaft $d$.

Before proceeding to describe the operation of the trap, it should be borne in mind that the portion 3 of the cylinder F, between the valve $g$ and piston $f'$, and (owing to the passage $x$) the portion 2 of the cylinder E, between the valves $e\ e'$, are always filled with live steam, conveyed through the passage $s'$ from the boiler, and that the portion 1 of the cylinder F, between the valve $g$ and piston $f$, and (owing to the pipe $y$) the portions 4 of the cylinder E, between its ends and the pistons $e\ e'$, are always open to the atmosphere through the passage $s$.

When the reservoir A is filling with water, the valves $e\ e'$, pistons $f f'$, and valve $g$ are in the position shown in Fig. 2, the interior of the reservoir A being thus open to the atmosphere through the pipe G, passage $t$, space 1, and passage $s$, while the space behind the piston $f$ is open to steam through the passage $w$, space 2, passage $x$, space 3, and passage $s'$, and the space behind the piston $f'$ open to the atmosphere through the passage $w'$, space 4, pipe $y$, space 1, and passage $s$.

As the reservoir A becomes filled with water, however, the bucket B will be lifted, and its shaft $d$ and lever D operated, so that by the time the reservoir is filled to the proper height, the short arm $p$ of the said lever will have moved the valve-rod $i$ to such an extent that the valves $e\ e'$ are in the positions shown in Fig. 3. Steam now passes through the passage $w'$ to the space behind the piston $f'$, and as the space behind the piston $f$ is now open to the atmosphere through the passage $w$, the pistons $f f'$ and their valve $g$ will be moved to the position shown in Fig. 3, so that the communication between the interior of the reservoir A and the atmosphere, by way of the passages $t$ and $s$ and space 1, is cut off, and the interior of said reservoir caused to communicate with the steam-space of the boiler through the passages $t$ and $s'$ and space 3.

It should be understood that the reservoir A is above the water-level of the boiler, so that as soon as the pressure in the boiler and reservoir is equalized, the water in the reservoir will pass, by its own gravity, into the boiler.

As the water-level in the reservoir descends, the bucket B drops, and by the time it has reached its lowermost position the arm $p$ of the lever D will have moved the valve-rod $i$ to the position shown in Fig. 2, thus again opening communication between the atmosphere and the space back of the piston $f'$, through the passage $w'$, and permitting steam to enter, through the passage $w$, the space back of the piston $f$, and thus cause a movement of the valve $g$ to the position, Fig. 2, so as to cut off the communication of the reservoir with the steam-space of the boiler, and open communication between said reservoir and the atmosphere. The above operations are thus repeated indefinitely.

I claim as my invention—

The combination of the cylinder F, its passages $s$, $s'$, and $t$, valve $g$, and pistons $f\,f'$, and the cylinder E and its valves $e\,e'$, with the passages $w$, $w'$, $x$, and $y$ between the two cylinders, arranged and operating substantially as set forth.

In testimony whereof I have signed my name to this specification in the presence of two subscribing witnesses.

THOMAS E. McNEILL.

Witnesses:
  STEPHEN I. GEOGHEGAN,
  JAMES M. KERR.